(12) United States Patent
Arpee

(10) Patent No.: US 11,943,204 B2
(45) Date of Patent: Mar. 26, 2024

(54) METHOD AND SYSTEMS FOR DYNAMIC SPECTRUM SHARING WITH A SPECTRUM MANAGEMENT FIREWALL

(71) Applicant: RIVADA NETWORKS, LLC, Colorado Springs, CO (US)

(72) Inventor: John Arpee, Herndon, VA (US)

(73) Assignee: Rivada Networks, LLC, Colorado Springs, CO (US)

(*) Notice: Subject to any disclaimer, the term of this patent is extended or adjusted under 35 U.S.C. 154(b) by 349 days.

(21) Appl. No.: 17/502,099

(22) Filed: Oct. 15, 2021

(65) Prior Publication Data
US 2022/0124068 A1 Apr. 21, 2022

Related U.S. Application Data

(60) Provisional application No. 63/092,370, filed on Oct. 15, 2020.

(51) Int. Cl.
*H04L 9/40* (2022.01)
*G06N 3/045* (2023.01)
*H04W 16/14* (2009.01)

(52) U.S. Cl.
CPC .......... *H04L 63/029* (2013.01); *G06N 3/045* (2023.01); *H04W 16/14* (2013.01)

(58) Field of Classification Search
CPC .................................................. H04L 63/029
See application file for complete search history.

(56) References Cited

U.S. PATENT DOCUMENTS

| 10,869,200 B1* | 12/2020 | Huang ................ H04W 16/06 |
| 2009/0047950 A1* | 2/2009 | Doppler ............ H04W 48/14 |
| | | 455/435.1 |
| 2015/0270888 A1* | 9/2015 | Watanabe ............ H04B 7/14 |
| | | 370/315 |

* cited by examiner

*Primary Examiner* — Hsinchun Liao
(74) *Attorney, Agent, or Firm* — THE MARBURY LAW GROUP, PLLC

(57) ABSTRACT

Methods and systems for dynamically sharing spectrum between a commercial network and a protected system network. A spectrum management firewall (SMF) computing device may receive information from the commercial network, receive characteristic information identifying one or more characteristics of a resource or entity in the protected system network, determine a class of system (COS) and an area of operation (AOO) for the resource or entity based on the characteristic information received from the protected system network, and determine potential interference based on the information received from the commercial network and the characteristic information received from the protected system network. The SMF may determine which frequencies may be suppressed on which cells in the commercial network based on the determined potential interference, generate a suppression message that identifies the determined frequencies per cell, and send the generated suppression message to a component in the commercial network.

33 Claims, 11 Drawing Sheets

METHOD AND SYSTEMS FOR DYNAMIC SPECTRUM SHARING WITH A SPECTRUM MANAGEMENT FIREWALL

RELATED APPLICATIONS

This application claims the benefit of priority to U.S. Provisional Application No. 63/092,370, entitled "Method And Systems for Dynamic Spectrum Sharing With A Spectrum Management Firewall" filed Oct. 15, 2020, the entire contents of which is hereby incorporated by reference for all purposes.

BACKGROUND

With the ever-increasing use of wireless communication devices for accessing networks and streaming or downloading large files (e.g., video files), there is an increasing demand for radio frequency spectrum. In any given cell or geographic area, there may be a multitude of devices trying to access finite radio frequency (RF) bandwidth allocated to such services. Yet parts of the RF spectrum go largely unused. Improved methods and solutions for sharing and better managing telecommunication resources (e.g., radio frequency spectrum, etc.) will be beneficial to the service providers, telecommunication networks, and to the consumers of telecommunication services.

SUMMARY

The various aspects include methods of dynamically sharing spectrum between a commercial network and a protected system network, which may including receiving, by a processor a spectrum management firewall (SMF) computing device, information from the commercial network, receiving, by the processor, characteristic information identifying one or more characteristics of a resource or entity in the protected system network, determining, by the processor, a class of system (COS) and a planned area of operation (PAOO) for the resource or entity based on the characteristic information received from the protected system network, determining, by the processor, potential interference based on the information received from the commercial network and the characteristic information received from the protected system network, determining, by the processor, which frequencies may be suppressed on which cells in the commercial network based on the determined potential interference, generating, by the processor, a suppression message that identifies the determined frequencies per cell, and sending, by the processor, the generated suppression message to a component in the commercial network to cause that component to suppress the identified frequencies in the identified cells.

In some aspects, generating the suppression message that identifies the determined frequencies per cell may include generating an obfuscation message that mask or cloak the activities, operations, communications, locations, features, properties, or characteristics of the resource or entity in the protected system network. In some aspects, generating the obfuscation message may include adding additional frequencies that mask the activities, operations, communications, locations, features, properties, or characteristics of the resource or entity in the protected system network to the suppression message.

Some aspects may include using a generative adversarial network (GAN) that includes a deep neural network and a generator to produce fake data, inserting the generated fake data into the suppression message prior to sending the generated suppression message to the component in the commercial network, or using the generated fake data to generate additional suppression messages that are intentionally misleading and sending the additional suppression messages to the component in the commercial network.

Some aspects may include using a generative adversarial network (GAN) that includes a deep neural network and a generator to detect and differentiate between real and fake activities of the resource or entities in the protected systems network. In some aspects, receiving characteristic information from the protected system network may include receiving detected activity information, signal level information and frequency information collected by sensors within a vicinity of the resource or entity in the protected systems network in response to detecting that the resource or entity recently became active, and determining the COS and the PAOO based on the characteristic information received from the protected system network may include determining the COS and an approximate area associated with the recently active resource or entity based on the received activity information, signal level information, and frequency information.

In some aspects, receiving characteristic information from the protected system network may include receiving a spectrum reservation message from the protected system network indicating that the resource or entity is anticipated to become active in an area, and determining the COS and the PAOO based on the characteristic information received from the protected system network may include determining the COS and an approximate area of the resource or entity that is anticipated to become active based on the received spectrum reservation message.

In some aspects, sending the generated message to the component in the commercial network to cause that component to suppress the identified frequencies in the identified cells may include sending the generated message to the component in the commercial network to cause that component to stop all transmissions on the identified frequencies, reduce power on the identified frequencies, reorient antennas to direct power away from the resource or entity in the protected systems network, or down-tilt or direct the antennas into focused areas that only allow the power to be transmitted in the immediate vicinity of the identified cells. Some aspects may include receiving, by the processor, a notification message from the protected system network indicating that a detected activity identified in the received characteristic information has ceased, and causing, by the processor, the component in the commercial network to cease suppressing the identified frequencies in the identified cells and restore power levels in response to the processor receiving the notification message from the protected system network indicating that the detected activity identified in the received characteristic information has ceased.

In some aspects, causing the component in the commercial network to cease suppressing the identified frequencies in the identified cells and restore power levels may include sending a communication message to the component that causes the component to reorient and uptilt antennas back to configurations that are optimized for full utilization of the identified frequencies on the commercial network. In some aspects, determining potential interference based on the information received from the commercial network and the characteristic information received from the protected system network may include determining the cell sites and frequencies that would result in interference between the resource or entity within the protected systems network and specific cells and attached mobiles in the commercial network.

Further aspects may include a computing device having a processor configured with processor-executable instructions to perform various operations corresponding to the methods discussed above.

Further aspects may include a computing device having various means for performing functions corresponding to the method operations discussed above.

Further aspects may include a non-transitory processor-readable storage medium having stored thereon processor-executable instructions configured to cause a processor to perform various operations corresponding to the method operations discussed above.

BRIEF DESCRIPTION OF THE DRAWINGS

The accompanying drawings, which are incorporated herein and constitute part of this specification, illustrate exemplary embodiments of the invention, and, together with the general description given above and the detailed description given below, serve to explain features of the invention.

DETAILED DESCRIPTION

Figure 1:
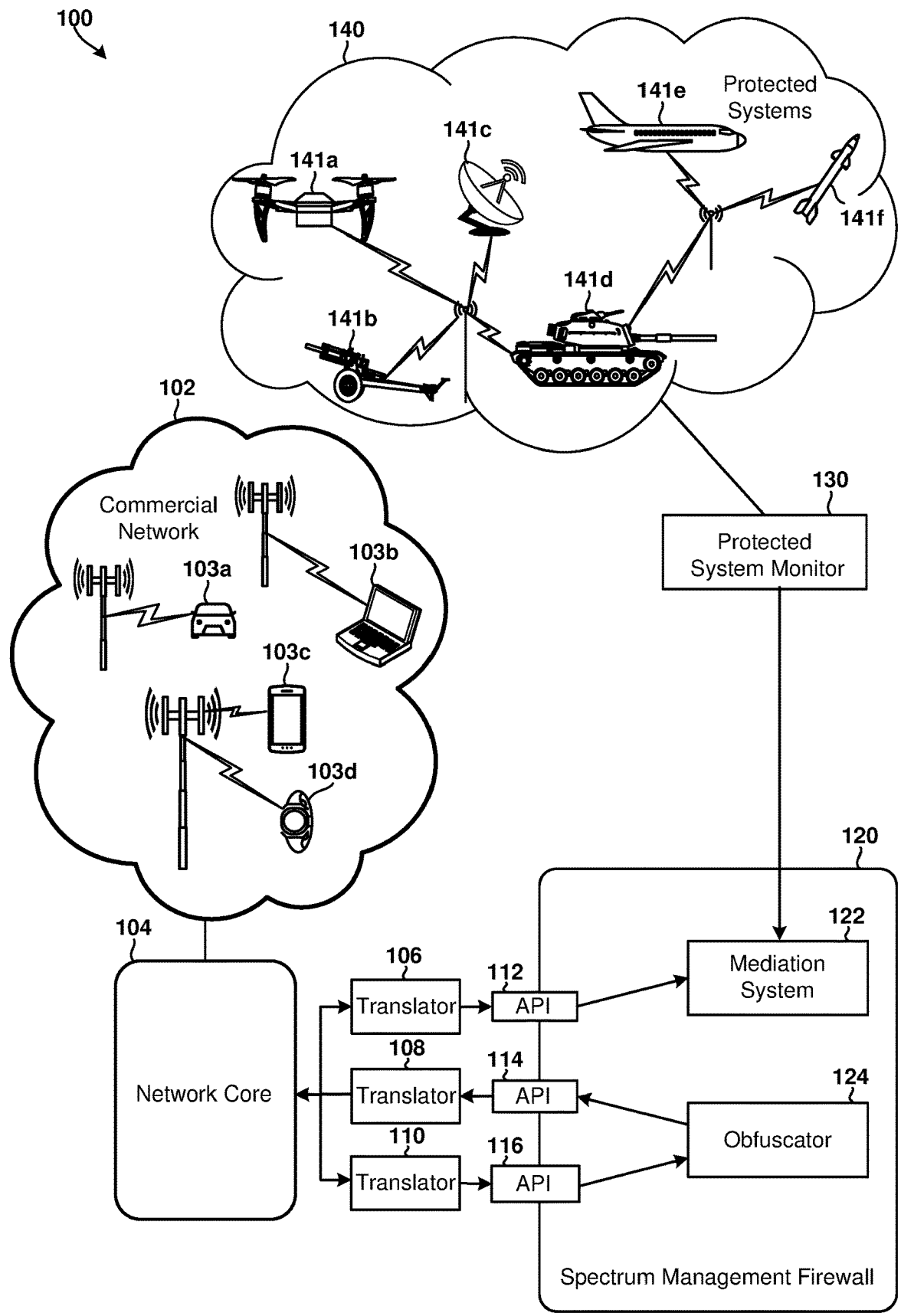
FIG. 1 is system block diagrams illustrating various logical and functional components and communication links in a communication system that may be used to implement spectrum sharing in accordance with the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

As used herein, the terms "wireless device," "mobile device," and "user equipment (UE)" may be used interchangeably and refer to any one of various cellular telephones, personal data assistants (PDA's), palm-top computers, laptop computers with wireless modems, wireless electronic mail receivers (e.g., the Blackberry® and Treo® devices), multimedia Internet enabled cellular telephones (e.g., the iPhone®), and similar personal electronic devices. A wireless device may include a programmable processor and memory. In a preferred embodiment, the wireless device is a cellular handheld device (e.g., a wireless device), which can communicate via a cellular telephone communications network.

As used in this application, the terms "component," "module," "engine," "manager" are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, a computer, a server, network hardware, etc. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon.

The term "neural network" may be used herein to refer to an interconnected group of processing nodes (or neuron models) that collectively operate as a software application or process that controls a function of a computing device and/or generates an overall inference result as output. Individual nodes in a neural network may attempt to emulate biological neurons by receiving input data, performing simple operations on the input data to generate output data, and passing the output data (also called "activation") to the next node in the network. Each node may be associated with a weight value that defines or governs the relationship between input data and output data. A neural network may learn to perform new tasks over time by adjusting these weight values. In some cases, the overall structure of the neural network and/or the operations of the processing nodes do not change as the neural network learns a task. Rather, learning is accomplished during a "training" process in which the values of the weights in each layer are determined. As an example, the training process may include causing the neural network to process a task for which an expected/desired output is known, comparing the activations generated by the neural network to the expected/desired output, and determining the values of the weights in each layer based on the comparison results. After the training process is complete, the neural network may begin "inference" to process a new task with the determined weights.

The term "inference" may be used herein to refer to a process that is performed at runtime or during execution of the software application program corresponding to the neural network. Inference may include traversing the processing nodes in the neural network along a forward path to produce one or more values as an overall activation or overall "inference result."

The term "deep neural network" may be used herein to refer to a neural network that implements a layered architecture in which the output (activation) of a first layer of nodes becomes an input to a second layer of nodes, the output of a second layer of nodes becomes an input to a third layer of nodes, and so on. As such, computations in a deep neural network may be distributed over a population of processing nodes that make up a computational chain.

The term "generative adversarial network (GAN)" may be used herein to refer to a specific type of machine learning system, technique or technology that is implemented or used by the various embodiments. A generative adversarial network may include two or more neural networks that compete with each other in a game (e.g., a zero-sum game in which one's gain is another's loss). For example, a generative adversarial network may include a deep neural network (DNN) and a generator. The generator may be viewed as the inverse of a layer of artificial neurons. Because the layer includes non-linear elements, the inverse transform may be lossy. When the layer is trained, patterns of inputs that are significant may be encoded onto the output and recovered with reasonable accuracy. The input to the generator may be much smaller vector of numbers relative to the inputs to its related generative adversarial network. Outputs of the generator may be classified as a match by the related generative adversarial network. The generator may be lossy because it may not be able to regenerate patterns that are not a good match for the desired category of outputs. As an example, the generator is configured to generate images that look like dogs, the generator may be unable to generate images of cats.

The term "fake" may be used herein to refer to a decoy system or pattern using a credible signature that is not related to a real system. Some embodiments may include components (e.g., a spectrum management firewall or "SMF", etc.) that are configured to use generative adversarial networks to generate fake frequency blanking patterns to obscure operations that might otherwise be revealed by reverse engineering the frequency suppression messages.

The term "credible signature" may be used herein to refer to a pattern such as a spectrum signature or an activity pattern that is plausible. Activity patterns are descriptions of the movements and spectrum activities of these systems. A generative adversarial network may be used to produce credible signatures of activity patterns.

The term "movement signature" may be used herein to refer to a pattern of movement that is indicative of a particular type of platform such as a vehicle, airplane or ship.

The term "mode signature" may be used herein to refer to a pattern of spectrum use that is typical of a type of system such as a communication system or a radar or a pattern of operating modes associated with a specific system such as a specific version of an Aegis radar.

The term "spectrum signature" may be used herein to refer to a pattern of spectrum transmit signals combined with a related pattern of receive frequencies that must be protected. This could be modeled as an emission spectrum defined as a list of power spectrum densities as a function of frequency. The protection data would be a list of maximum allowed interference signal levels or spectrum density per frequency. One spectrum signature (transmit and receive) is defined per operating mode of a type of system. Multiple types of systems may be active onboard a platform.

The term "credible mask" may be used herein to refer to a credible signature that encloses the signature of a protected (or secret, primary, etc.) system. The credible mask must be at least as wide and at least as sensitive to interference so that when the system blanks frequencies, the interference protection would be more than adequate to protect the protected system.

The term "coordination interval" may be used herein to refer to time intervals used by a 5G core, regulator, and/or generator to coordinate network traffic. The traffic demand levels and patterns may be synchronized on the basis of these intervals.

The terms "spectrum sharing" and "sharing spectrum" may be used interchangeably herein to refer to systems, techniques, and/or technologies that help optimize the use of the airwaves, or wireless communications channels, by enabling multiple categories of users to safely share the same frequency bands. Though the wireless industry has been tooting the spectrum sharing horn for over a decade, the vast majority of incumbent mobile network operators (MNOs) have not made sufficient technical progress toward realizing suitable solutions, often because it is simply not in their current best interest to do so. The various embodiments include components that configured to incentivize the wireless industry and commercial network providers/operators to develop, improve upon, implement and/or use spectrum sharing techniques and solutions that improve the efficiency, performance and functionality of the network.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3GSM, general packet radio service (GPRS), code division multiple access (CDMA) systems (e.g., cdmaOne, CDMA2000™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), public switched telephone network (PSTN), Wi-Fi Protected Access I & II (WPA, WPA2), Bluetooth®, integrated digital enhanced network (iden), land mobile radio (LMR), and evolved universal terrestrial radio access network (E-UTRAN). Each of these technologies involves, for example, the transmission and reception of voice, data, signaling and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

5G new radio (NR) and other recently developed communication technologies allow wireless devices to communicate information at data rates (e.g., in terms of Gigabits per second, etc.) that are orders of magnitude greater than even 4G Long Term Evolution (LTE) network. 5G networks are also more secure, resilient to multipath fading, allow for lower network traffic latencies, and provide better communication efficiencies. As such, developed and developing nations are feverishly moving forward with 5G rollouts. In doing so, many are using radio spectrum bands that, in the United States, are currently allocated to a government entity (GE), such as the department of defense (DOD).

Concurrent with these developments, in the United States, the GEs are moving towards implementing their own 5G networks and solutions. Each GE could own, build and/or operate its own 5G network in spectrum that it currently occupies. However, a GE-owned and/or GE-operated network (e.g., a wholly owned exclusive-use GE 5G network, etc.) may be an inefficient use of limited resources (e.g., spectrum, network or resulting broadband capacity, infrastructure, network equipment, etc.). In addition, owning a nationwide network has numerous disadvantages for GE.

Chief among the disadvantages of GE ownership is cost. If a GE were to build, operate and own a 5G network for its exclusive use, it would need to pay for the entire cost of that network—likely many billions of dollars at least, plus billions more every year for operations and maintenance. There are further disadvantages related to the limited coverage and capacity of a wholly owned exclusive-use GE 5G network. As an example, due to cost constraints imposed by the need to fully fund its deployment and operations, a wholly owned exclusive-use GE 5G network would likely be smaller than ideal in terms of both coverage and capacity. The limited scale of such a network could prevent, reduce or otherwise limit market-driven commitments from important vendors of infrastructure, network equipment, mobile terminals (including smartphones), software, operating systems and other capabilities that are critical to the success of the non-foreign 5G ecosystem. As another example, implementation and use of wholly owned exclusive-use GE 5G network could prevent the GE from benefiting from the many important technological developments and innovations resulting from the operations of a commercial network (e.g., commercial wholesale network, commercially scaled network, etc.).

In contrast to wholly owned exclusive-use networks, commercial networks may be built on an accelerated basis with greater coverage at a lower cost through partnerships with owners or providers of existing infrastructure (e.g., backhaul, power, rights of access, towers, community owned infrastructure such as land lots, rooftops and water towers, etc.). In addition, commercial networks may allow for an efficient exchange of access to infrastructure for wholesale capacity (that can be used or resold) and/or further reduce costs by "hosting" the spectrum of others that need access to shared infrastructure (e.g., similar to the regional or community-oriented bidders in the recent citizens broadband radio service (CBRS) auction, etc.).

As such, a better alternative to a wholly owned exclusive-use GE 5G network is a GE network that implements spectrum sharing techniques, obtains the above-described benefits associated with commercial networks, and reduces or eliminates the above-described disadvantages or challenges associated with implementing or operating a wholly owned exclusive-use network. The various embodiments include components that may be deployed or used in a GE network to allow the GE network to utilize spectrum sharing techniques, obtain the above-described benefits associated with commercial networks, and reduce or eliminate the above-described disadvantages or challenges associated with implementing or operating a wholly owned exclusive-use network.

FIG. 1 illustrates a system 100 that includes a spectrum management firewall (SMF) 120 component, which may be configured to delineate between commercial operations and GE operations and/or to otherwise implement, support, or provide networks and dynamic spectrum sharing techniques in accordance with the various embodiments. In the example illustrated in FIG. 1, the system 100 includes a commercial network 102, a network core 104, translator 106-110 components, API 112-116 components, the SMF 120 component, a secret, primary, or protected system monitor 130 and a protected systems network 140.

The commercial network 102 may be a 4G LTE or 5G NR network that includes various user equipment (UE) devices 103, such as the illustrated connected car 103, laptop computer 103b, smartphone 103c, and wearable device 103d. The commercial network 102 may include connections or communication links to the SMF 120 component via the network core 104, translator 106-110 components, and/or API 112-116 components. The commercial network 102 (and its constituent components) may be configured to use cooperative methods, techniques and/or solutions, which are generally not designed for, or not suitable for use in, contested environments (e.g., battlefields, etc.).

The network core 104 may include various components (e.g., control systems, network interfaces, tec.) that allow the commercial network 102 to cooperate, interoperate and/or communicate with other networks and systems. In some embodiments, the network core 104 may be 5G core network (5GC) that is included as part of the commercial network 102. A 5GC may include various network functions (NF), examples of which include an authentication server function (AUSF), core access and mobility management function (AMF), data network (DN), structured data storage network function (SDSF), unstructured data storage network function (UDSF), network exposure function (NEF), network function repository function (NRF), policy control function (PCF), session management function (SMF), unified data management (UDM), user plane function (UPF) and application function (AF).

The translator 106-110 components may be configured to allow the commercial network 102 to interface with the SMF 120 component. For example, the translator 106-110 components may be configured to covert data formats to enable the SMF 120 component to communicate and/or interoperate with the components in the commercial network 102.

The API 112-116 components may be documented interfaces that facilitate communications between the SMF 120 component and the commercial network 102.

The protected systems network 140 may be a network that is owned, operated or associated with a government entity (GE), and may include various secure or sensitive government resources/assets 141 that have priority use of the spectrum and/or whose operational patterns should be obscured. Examples of such resources/assets 141 include the illustrated unmanned aerial vehicle (UAV) 141a, artillery equipment 141b, radar 141c, armored fighting vehicle (AFV) 141d, aircraft 141e, and guided missile/rocket 141f. The protected systems network 140 may be configured to use autonomous and/or competitive methods that are more appropriate for contested environments (e.g., battlefields, etc.). The protected systems network 140 may include connections or communication links to the SMF 120 component via the protected system monitor 130.

The protected system monitor 130 may be configured to receive or collect data about the activities of resources/assets 141 in the protected systems network 140, and send the received/collected data to the SMF 120 component (or to the mediation system 122 of the SMF 120 component). In some embodiments, the protected system monitor 130 may be configured to receive the data from direct communications links that the resources/assets 141 use to announce their activities. In some embodiments, the system 100 may include sensors that are deployed in and/or near the area of operations of the resources/assets 141 in the protected systems network 140. The resources/assets 141 (or their associated sensors) may be configured to send data to the protected system monitor 130. Examples of the types of data that may be received or collected by the protected system monitor 130 include radar data, imagery and radio signals transmitted by the resources/assets 141 or by other systems in proximity to the resources/assets 141, current operating conditions, recent activities, communications, etc.

The SMF 120 component (and/or its constituent components) may be configured to enable, allow, provide or facilitate secure communications, interactions, collaborations, and spectrum sharing between the components in the commercial network 102 and the components in the protected systems network 140. For example, the SMF 120 component may be configured to prevent leakage of sensitive operational information (e.g., by transmitting blanking patterns to the commercial network 130, etc.) so that the components in commercial network 102 and the protected systems network 140 may readily share telecommunication resources (e.g., RF spectrum resources, etc.). This added level of security may allow the components within these networks 102, 1040 to integrate, collaborate and/or cooperate more readily, thereby further improving the performance and functioning of the overall system 100 and its constituent components.

As an example, the inclusion and use of the SMF 120 component may allow the system 100 (and/or its components) to use adaptive radars and systems with anti-jamming capabilities that included in the protected systems network 140 in conjunction with adaptive frequency allocation techniques, massive multiple-input and multiple-output (MIMO), self-optimizing networks, and/or other techniques for avoiding interference and increasing utilization of the spectrum that are included in, provided by, or made available by a commercial network 102. For these and other reasons, the inclusion and use of the SMF 120 component in accordance with the various embodiments may significantly improve the performance and functioning of the system 100 and its components.

In the example illustrate in FIG. 1, the SMF 120 component includes a mediation system 122 and an obfuscator 124 component.

The obfuscator 124 component may be configured to protect information about the activities, locations, and properties of the resources/assets 141 in the protected systems network 140 that use the radio spectrum. For instance, the obfuscator 124 component may be configured to mask or cloak the activities, operations, communications, locations, features, properties, or characteristics of the identified or evaluated resources/assets 141 by adding additional frequencies to mask the properties of the resources/assets 141. The obfuscator may also create decoy system activity to obscure the operational patterns of resources/assets 141, generate noise that obscures one or more features of the blanking patterns, and/or otherwise change the appearance or observable characteristics of the of the system 100, the protected systems network 140, and/or the resources/assets 141.

The mediation system 122 may be configured to coordinate spectrum use between resources/assets 141 in the protected systems network 140 and the UEs 103 in the commercial network 102. For instance, the mediation system 122 may be configured to identify the resources/assets 141 in the protected systems network 140, determine the resources/assets 141 are active, determine the activities of the active resources/assets 141, determine the types and numbers of each type of active resources/assets 141, determine, predict or estimate the locations of the active resources/assets 141, determine the frequencies, cell sites, and locations that are available for use by the UEs 103 in the commercial network 102, determine which systems are likely to interfere, and/or determine the frequencies that should be allowed or suppressed at specific sites in the commercial network 102 (e.g., to avoid interference, etc.). The mediation system 122 may cause the networks 102, 140 to allow or suppress the determined frequencies at the determined cell sites and/or locations based on the activities and/or locations of the resources/assets 141 and/or based on information received or collected from the protected system monitor 130.

In some embodiments, the mediation system 122 may be configured to determine whether there is a high probability that two or more systems (e.g., commercial network 102 and protected systems network 140, etc.) will interfere with one another.

In some embodiments, the mediation system 122 may be configured to determine the probability that two or more systems will interfere based on propagation models and/or information stored in databases of transmitter or receiver characteristics.

As mentioned above, the mediation system 122 may be configured to identify the resources/assets 141 in the protected systems network 140 and perform other related tasks. In some embodiments, the mediation system 122 may be configured to identify the class of the resources/assets 141 (without identifying the specific resources/assets 141) in response to determining that a resource/asset 141 cannot or should not be readily identified. Alternatively, or in addition, the mediation system 122 may be configured to categorize a resource/asset 141 as an unidentified system type (also without identifying the specific resources/assets 141) in response to determining that a resource/asset 141 cannot or should not be readily identified.

In some embodiments, the mediation system 122 may be configured to detect activity on or by the resources/assets 141 included in the protected systems network 140. The mediation system 122 may detect the activity directly (e.g., through sensing) or indirectly (e.g., through encrypted messages received from the resources/assets 141, etc.). In either case, the collection and handling of the data regarding the activity may be in a completely secured environment on the protected systems network 140 side of the SMF 120 component.

In some embodiments, the mediation system 122 may be configured to securely collect data from the resources/assets 141 included in the protected systems network 140, aggregate and/or analyze the collected data to generate analysis results, and use the generated analysis results to determine whether there are resources/assets 141 active within an area. In response to determining that there are resources/assets 141 active within the area, the mediation system 122 (or another component in the SMF 120) may identify the nearby areas and commercial networks 102 that need to stop using those frequencies. The mediation system 122 (or another component) may generate and send communication messages to instruct the components (e.g., mobile devices, etc.) in the identified areas and/or the commercial networks 102 to stop using select frequencies and/or to perform other responsive actions.

In some embodiments, the SMF 120 component may be configured to use other methods to detect or respond to activity of the resources/assets 141 in the protected systems network 140. For example, the SMF 120 component may determine that an active resource/asset 141 is primarily listening (e.g., acting as sensors, rather than transmitting, etc.) at some location. In response, the SMF 120 component may determine the location of a listening point for that resource/asset 141, use information about the location of the listening point to identify the areas and commercial networks 102 that are to stop using the associated frequencies, and generate and send communication messages to instruct the components (e.g., mobile devices, etc.) in the identified areas and/or the commercial networks 102 to stop using select frequencies and/or to perform other responsive actions.

As mentioned above, to increase security, the collection and handling of the data regarding the activity may be in a completely secured environment on the protected systems network 140 side of the SMF 120 component. To further increase security, in some embodiments, the SMF 120 component may be configured such that it does not transmit any specific information regarding the components in the protected systems network 140. For example, the SMF 120 component may be configured to only transmit information regarding the frequencies that may be suppressed or permitted within predefined areas. Alternatively, or in addition, the SMF 120 component may be configured to insert decoy patterns of suppressed frequencies into the messages transmitted to the commercial network 102. The decoy patterns may help further obfuscate any sensitive operational information, further securing the secure resources and government assets 141 included in the protected systems network 140.

In some embodiments, the SMF 120 component may be configured to send the commercial network 102 lists of frequencies that are allowed or blocked at specific cells in the network. Each network may have a slightly different way of organizing and presenting information about cells and frequencies, but all modern cellular networks include or provide the data in some format. The SMF 120 component may use the data in any or all available formats to determine the frequencies that are or should allowed or blocked.

In some embodiments, the system 100, SMF 120 component, or obfuscator 124 component may include, utilize, work in conjunction with, or implement generative adversarial networks (GAN), machine learning (ML) and/or artificial intelligence (AI). For example, in some embodiment, the system 100 may include a GAN component (not illustrated separately in FIG. 1) that has access to the outputs of the SMF 120 component and protected system monitor 130. The GAN component may use these outputs to detect and differentiate between real and fake activities of the resources/assets 141 in the protected systems network 140.

For example, the GAN component may include a deep neural network and a generator. In some embodiments, the generator and the deep neural network (DNN) of the generative adversarial network may be co-optimized. The optimization may begin with a collection of valid inputs and a collection of random inputs. In the first cycle, random data (noise) may be injected into the generator. The deep neural network may be optimized using the random outputs of the generator as data that is "fake" combined with a reference data set that is "true". After the deep neural network is optimized, the scores for the fake data may be passed back to the generator. The generator may then be optimized to produce better fakes (e.g., higher scores) from the deep neural network, and another cycle may begin. After many cycles, the fake data from the generator may be very similar (or indistinguishable or nearly indistinguishable) to the true data. The obfuscator 124 component may use the fake data to mask the properties and/or activities of the resources/assets 141.

In some embodiments, the generative adversarial network (GAN) may include a deep neural network (DNN) and generator configured in a competitive feedback loop producing high quality fakes and a sophisticated "fake detector", the optimized DNN, that operate competitively at roughly equal levels of effectiveness.

In some embodiments, the system 100 may include components that are configured to use or apply GANs to different related types of data. For example, the system 100 may include a component that is configured to use or apply GANs to the activity patterns of resources/assets 141, to sensor readings related to the activities of the resources/assets 141, and/or to frequency blanking messages from an obfuscator 124 component. The sensor readings may be readings that are generated at a collection of sensors due to the activity of protected systems, and the frequency blanking messages may be messages that are generated by the mediation system to prevent a commercial network from interfering with the protected systems. Each of these types of data may be subdivided into segments of time ranging from a few seconds to a few minutes of time.

In some embodiments, the system 100 may include multiple GAN components. For example, the system 100 may include one component that develops the obfuscation patterns, and another component that identifies the real activity of the resources/assets 141 (e.g., by detecting and ignoring irrelevant blanking patterns).

In some embodiments, the system 100 may include a collection of sensors that can report the spectral power density for one or more bands. The system 100 may collect or determine the amount of energy that is collected in a narrow frequency interval during a short period of time at a specific sensor, and apply the collected/determined information to a neural network (e.g., GAN, DNN, etc.) to generate an activation.

In some embodiments, the system 100 may include a sensor site that includes multiple receivers connected to directional antennas adding dimensionality to the data. The system 100 may apply the information collected/determined from the sensor site to a neural network to generate an activation.

In some embodiments, the system 100 may transform inputs (e.g., small units of information) into a GAN component (or into a deep neural network, etc.) into a linear array which is a vector of floating-point values. The inputs (or small units of information) may include signal strength, per small frequency interval, at each sensor that is collecting data, during small intervals of time (e.g., few seconds or minutes). In some embodiments, the data may include power per 1 kHz increment over a band.

Figure 2A:
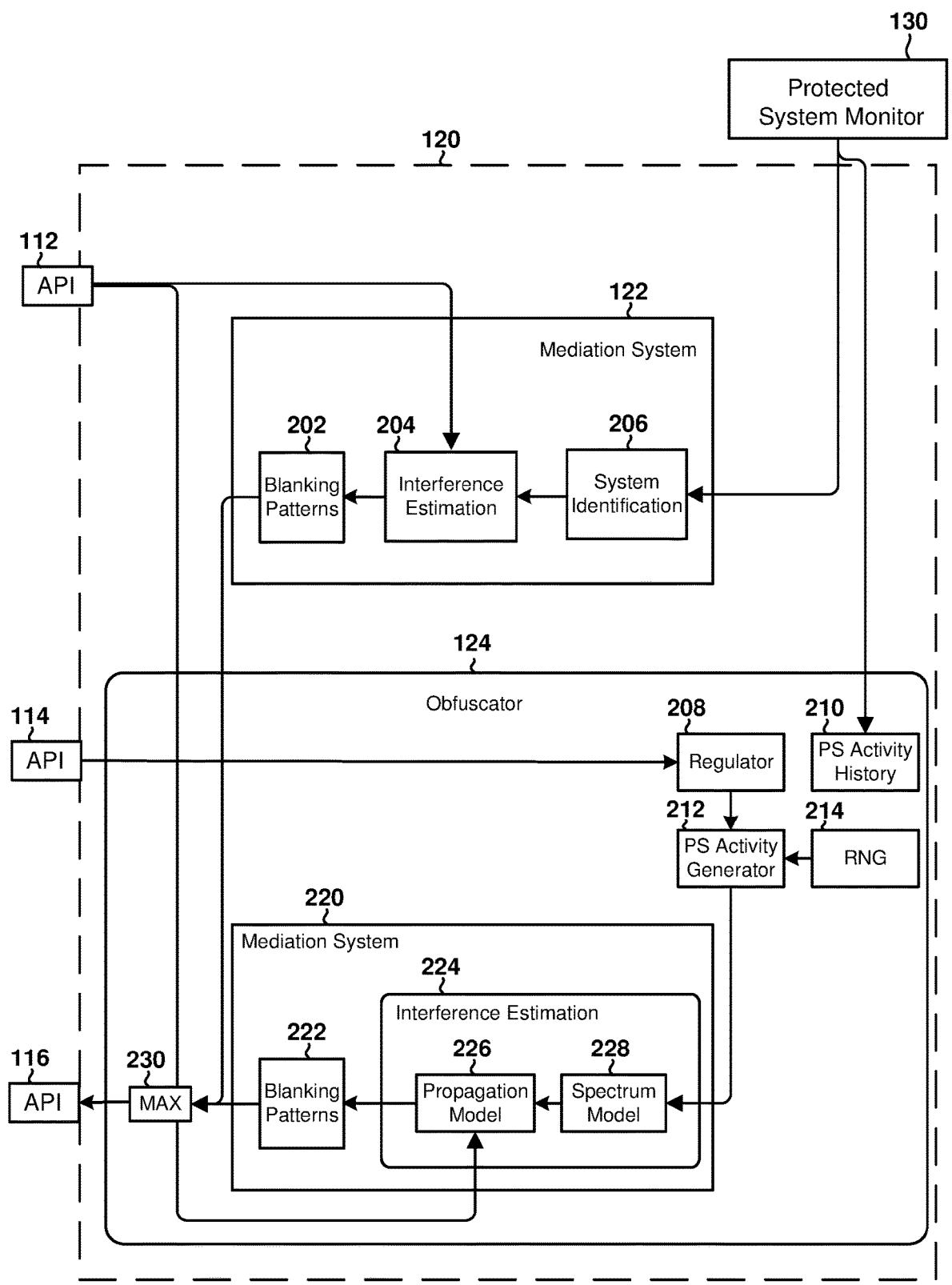
FIGS. 2A-2C are component block diagrams illustrating components and operations of spectrum management firewalls that could be configured to implement the various embodiments.
Figure 2B:
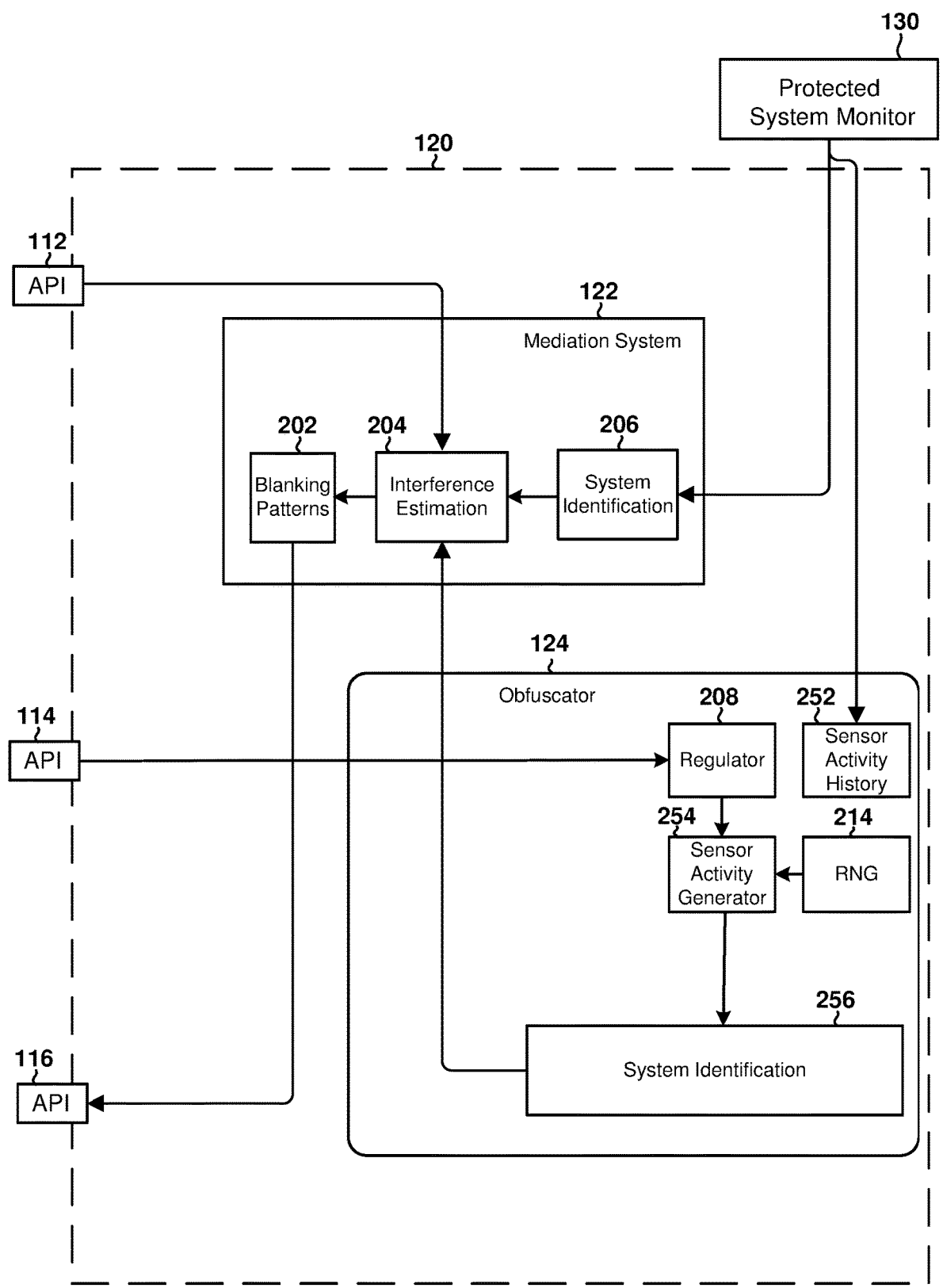
Figure 2C:
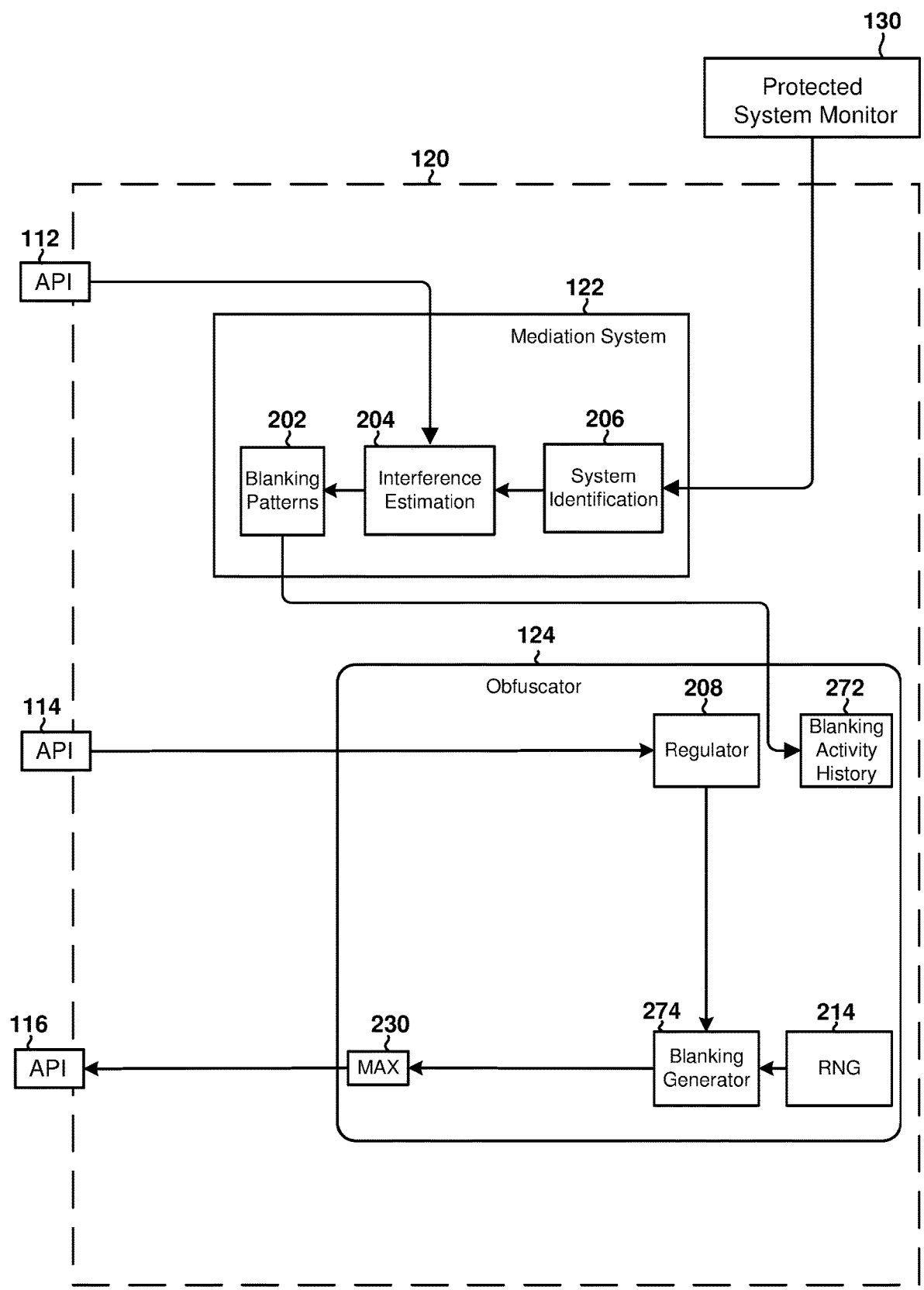

FIGS. 2A-2C illustrate various SMF 120 components that could be configured to enable, allow, provide or facilitate secure communications, interactions, collaborations, and spectrum sharing between a commercial network 102 and the protected systems network 140 in accordance with the various embodiments.

In the examples illustrated in FIGS. 2A-2C, the SMF 120 component includes a mediation system 122 and an obfuscator 124 component. The mediation system 122 may include blanking patterns 202 component, an interference estimation 204 component, and a system identification 206 component. The system identification 206 component may receive and use information from the protected system monitor 130 to identify active resources/assets 141. The interference estimation 204 component may receive and use information from the API 112 component and the system identification 206 component to determine the frequencies that are be suppressed at specific sites in the commercial network 102 to avoid interference. The blanking patterns 202 component may be configured to receive and use the determined frequencies for the identified devices to generate fake frequency blanking patterns that obscure operations that might otherwise be revealed by reverse engineering.

In the example illustrated in FIG. 2A, the obfuscator 124 component includes a regulator 208, a protected system (PS) activity history 210 component, a PS activity generator 212 component, a random number generator (RNG) 214 component, a mediation system 220, and a max 230 component. The mediation system 220 may include blanking patterns 222 and an interference estimation 224 component. The interference estimation 224 component may include a propagation model 226 and a spectrum model 228.

In the example illustrated in FIG. 2B, the obfuscator 124 component includes a regulator 208, a sensor activity history 252 component, a sensor activity generator 254 component, a random number generator (RNG) 214 component, and a system identification 256 component.

In the example illustrated in FIG. 2C, the obfuscator 124 component includes a regulator 208, a random number generator (RNG) 214, a max 230 component, a blanking activity history 272 component, and a blanking generator 274 component.

Figure 3:
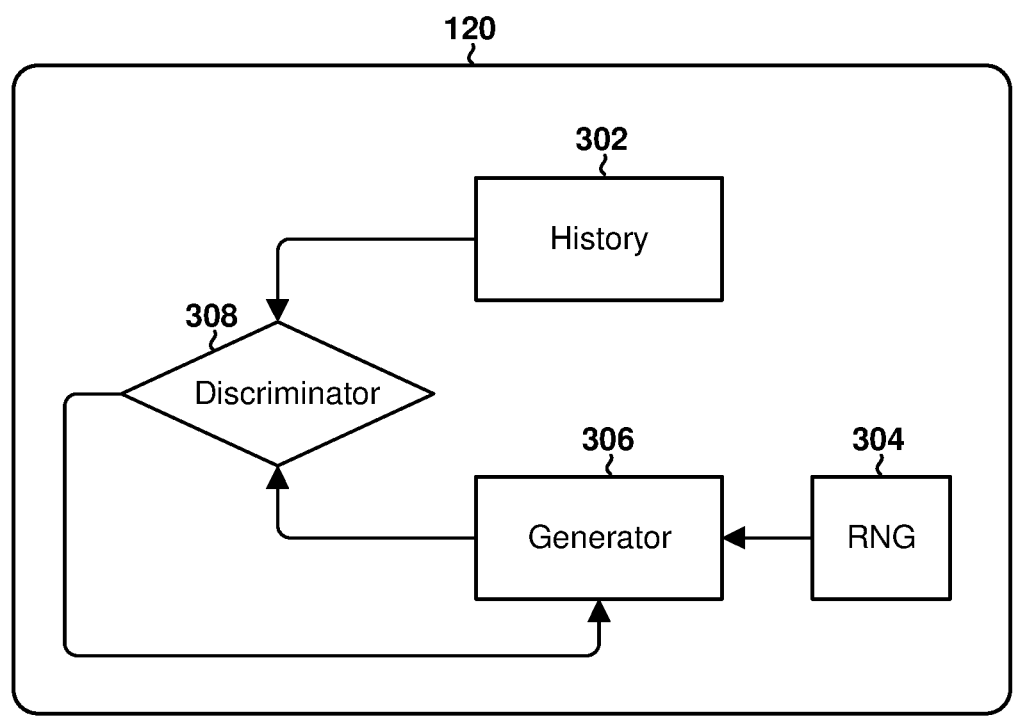
FIG. 3 is a component block diagram illustrating components and operations of a spectrum management firewall configured to train a generative adversarial network in accordance with some embodiments.

FIG. 3 illustrates various components that may be include included in a SMF 120 component and configured to train the system in accordance with some embodiments. In the example illustrated in FIG. 3, the system includes a history 302 component, a random number generator (RNG) 304, a generator 306 component, and a discriminator 308 component.

During the training process, GAN methods may be used to "adversarially" tune the discriminator and the activity generator. In each cycle of the training process, the generator 306 component may generate increasingly realistic activity patterns and the discriminator 308 component may become better and better at identifying fakes.

The system illustrated in FIG. 3 may be used to separately simulate coarse and fine features, which may then be combined in various ways. Using this feature or GANs, it is possible to train the generator 306 component on fine features taken from many systems and then use a different data set for the coarse features or to use some degree of manual adjustment to achieve particular properties.

Figure 4:
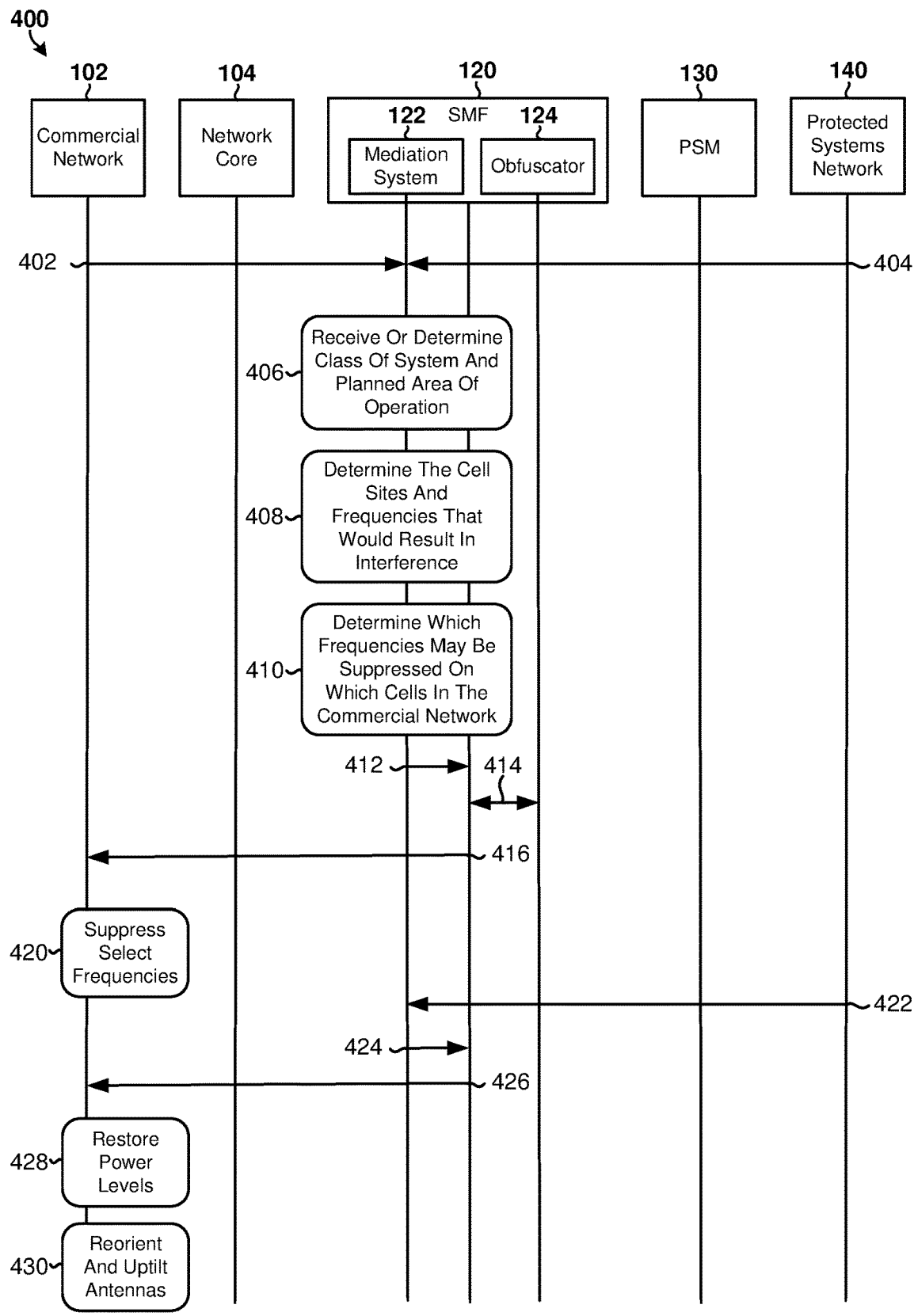
FIG. 4 is an activity diagram illustrating components, communications and operations in a communication system configured to dynamically share spectrum between a commercial network and a protected system network in accordance with the embodiments.

FIG. 4 illustrates a method 400 of using a spectrum management firewall (SMF) 120 to avoid interference in a system configured to dynamically share spectrum. Method 400 may be performed by one or more processors of components included in a commercial network 102, network core 104, SMF 120, mediation system 122, obfuscator 124, PSM 130, or protected systems network 140.

In operation 402, a component in the commercial network 102 may transmit information to mediation system 122 via the SMF 120. As discussed above, the SMF 120 may be configured to operate as a demark between the commercial network 102 and the protected systems network 140 in order to ensure that a GE or protected system network 140 is not operating the network and does not have access to user information.

In operation 404, a component in the protected system network 140 may send or transmit information regarding the characteristics of protected systems to the mediation system 122. The mediation system 122 may receive and use any or all such information to analyze potential interference.

In operation block 406, the mediation system 122 may receive and/or determine class of system and planned area of operation.

For example, in a sense and avoid configuration, when a component in the protected systems network 140 becomes active in an area, sensors within its vicinity detect the activity and transmit information about the signal levels and frequencies to the mediation system 122. In operation block 406, the mediation system 122 may use the received information (e.g., detected activity, information about the signal levels and frequencies, etc.) to determine which class of system is operating and its approximate area.

As another example, in a spectrum reservation, when a component in the protected systems network 140 is anticipated to begin operating with an area, the protected systems network 140 generates and sends (e.g., through the PSM 130, etc.) a spectrum reservation message to the mediation system 122. In operation block 406, the mediation system 122 may use the received information (e.g., information included in the spectrum reservation message) to determine which class of system is operating and its planned area of operation.

In operation block 408, the mediation system 122 may determine the cell sites and frequencies that would result in interference. For example, the mediation system 122 may calculates the cell sites and frequencies which would result in interference between components within the protected systems network 140 and specific cells and attached mobiles in the commercial network 120.

In operation block 410, the mediation system 122 may determine which frequencies may be suppressed on which cells in the commercial network 102.

In operation 412, the mediation system 122 may generate a message that indicates which frequencies may be suppressed on which cells in the commercial network (determined in operation block 410), and send the generated message to the SMF 120 component.

In some embodiments, in operation 414, the SMF 120 component may send the message to the obfuscator, which may perform various operations to mask or cloak the activities, operations, communications, locations, features, properties, or characteristics of the information (e.g., by adding additional frequencies to mask the properties, etc.), generate an obfuscation message, and send the obfuscation message back to the SMF 120.

In operation 416, the SMF 120 component may transmit or send the generated message or obfuscation message that identifies the suppressed frequencies per cell to the commercial network 102. In some embodiments, the SMF may also generate and send additional suppression messages that are intentionally misleading in operation 416.

In operation block 420, a component in the commercial network 102 may receive and use the information in the message to perform various operations to suppress the frequencies at each indicated site. For example, the component may stop all transmissions on the indicated frequencies, reduce power on the indicated frequencies, reorient antennas to direct power away from the susceptible protected systems (e.g., using additional information transmitted by the SMF 120, etc.), and/or downtilting antennas or directing them into focused areas that only allow the power to be transmitted in the immediate vicinity of the cell site.

In operation 422, a component in the protected system network 140 may generate and send a message that indicates the detected activity (e.g., activity detected in operation 404, etc.) has ceased within an area to the mediation system 122.

In operation 424, the mediation system 122 may generate and send a message indicating that frequency suppression has ended on selected frequencies per site to the SMF 120 component.

In operation 426, the SMF 120 component may send the message indicating that frequency suppression has ended on selected frequencies per site to the commercial network 102.

In operation block 428, a component in the commercial network may restore power levels.

In operation block 430, a component in the commercial network may reorient and uptilt antennas back to configurations that are optimized for full utilization of those frequencies on the commercial network.

Figure 5:
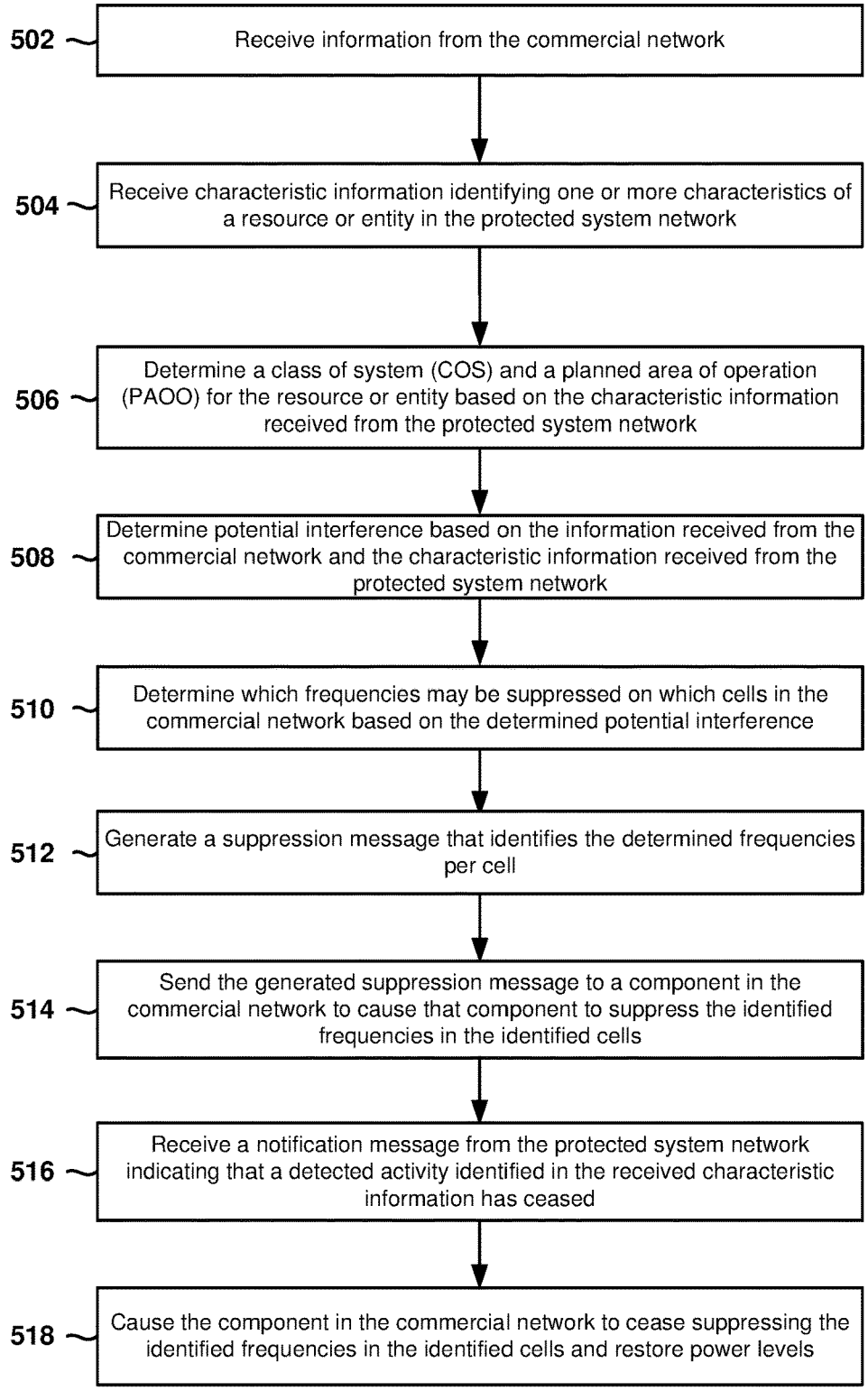
FIG. 5 is a process flow diagram illustrating a method of dynamically sharing spectrum between a commercial network and a protected system network in accordance with some embodiments.

FIG. 5 illustrates a method 500 for dynamically sharing spectrum between a commercial network and a protected system network in accordance with some embodiments. Method 500 may be implemented by a processor in a spectrum management firewall (SMF).

In block 502, the SMF may receive information from the commercial network.

In block 504, the SMF may receive characteristic information identifying one or more characteristics of a resource or entity in the protected system network. For example, in some embodiments the SMF may receive detected activity information, signal level information and frequency information collected by sensors within the vicinity of the resource or entity in the protected systems network. In some embodiments the SMF may receive spectrum reservation message from the protected system network indicating that the resource or entity is anticipated to become active in an area. In some embodiments, the SMF may receive the characteristic information in response to the sensors or SMF detecting that the resource or entity has recently become active. In some embodiments, the SMF may receive the characteristic information in response to the sensors or SMF detecting that the resource or entity is anticipated to become active in an area within a certain time or in the near future.

In block 506, the SMF may determine a class of system (COS) and a planned area of operation (PAOO) for the resource or entity based on the characteristic information received from the protected system network. In some embodiments, the SMF may determine the COS and an approximate area associated with the recently active resource or entity based on the activity information, signal level information, and/or frequency information received in block 504. In some embodiments, the SMF may determining the COS and an approximate area of a resource or entity that is anticipated to become active in an area (e.g., based on the received spectrum reservation message, etc.).

In block 508, the SMF may determine potential interference based on the information received from the commercial network and the characteristic information received from the protected system network. For example, the SMF may determine the cell sites and frequencies that would result in interference between the resource or entity within the protected systems network and specific cells and attached mobiles in the commercial network.

In block 510, the SMF may determine which frequencies may be suppressed on which cells in the commercial network based on the determined potential interference.

In block 512, the SMF may generate a suppression message that identifies the determined frequencies per cell. In some embodiments, the SMF may generate an obfuscation message that masks or cloaks the activities, operations, communications, locations, features, properties, or characteristics of the resource or entity in the protected system network.

In some embodiments, the SMF may generate the obfuscation message by adding additional frequencies to the suppression message. The added frequencies may mask the activities, operations, communications, locations, features, properties, or characteristics of the resource or entity in the protected system network.

In block 514, the SMF may send the generated suppression message to a component in the commercial network to cause that component to suppress the identified frequencies in the identified cells. For example, the SMF may send the generated message to the component in the commercial network to cause that component to stop all transmissions on the identified frequencies, reduce power on the identified frequencies, reorient antennas to direct power away from the resource or entity in the protected systems network, or down-tilt or direct the antennas into focused areas that only allow the power to be transmitted in the immediate vicinity of the identified cells.

In block 516, the SMF may receive a notification message from the protected system network indicating that a detected activity identified in the received characteristic information has ceased.

In block 518, the SMF may cause the component in the commercial network to cease suppressing the identified frequencies in the identified cells and restore power levels in response the SMF receiving the notification message from the protected system network in block 516 indicating that the detected activity identified in the received characteristic information has ceased. For example, the SMF may send a communication message to the component that causes the component to reorient and uptilt antennas back to configurations that are optimized for full utilization of the identified frequencies on the commercial network.

In some embodiments, method 500 may include using a generative adversarial network (GAN) that includes a deep neural network and a generator to detect and differentiate between real and fake activities of the resource or entities in the protected systems network.

In some embodiments, method 500 may include using a generative adversarial network (GAN) that includes a deep neural network and a generator to produce fake data. In some embodiments, method 500 may include inserting the generated fake data into the suppression message in block 512 and/or prior to sending the generated suppression message to the component in the commercial network in block 514. In some embodiments, method 500 may include use the generated fake data to generate additional suppression messages that are intentionally misleading, and sending the additional suppression messages to the component in the commercial network.

As discussed above, a GAN is one of the tools that may be used in the spectrum management firewall (SMF) to generate fake frequency blanking patterns to obscure operations that might otherwise be revealed by reverse engineering the frequency suppression messages emanating from the SMF. A GAN may include a DNN and generator configured in a competitive feedback loop producing high quality fakes and a sophisticated "fake detector", the optimized DNN, that operate competitively at roughly equal levels of effectiveness. GANs may be applied to three related types of data: the activity patterns of resources (or assets, entities, devices, etc.) in the protected systems; the sensor readings collected based on the activity of the resources; and frequency blanking messages from the obfuscator.

In some embodiments, the SMF may configured to use a GAN or other neural network technologies to implement methods for detection and masking of the activity of the resources (or assets, entities, devices, etc.) in a protected system. Such methods may include a training phase and an operational phase. During the training phase, the SMF may use neural network technologies with automated or manual labeling of data. During the normal activity in an area of operations, the SMF may collect many examples of resource movements and spectrum signatures. The SMF may identify the signatures and the type of system generating each signature, either manually or via an automated system that has information about the activities of the systems.

In some embodiments, the SMF may configured to collect signature data, label the collected data by type of system, and perform various neural network training phase operations. The neural network training phase operations may be performed for the detected activities of any type of resource or system. In some embodiments, the SMF may be configured to use a separate training process for specific systems or categories of systems.

In some embodiments, the SMF may configured to use the GAN to generate fake systems related to each type of identified resource or protected system, and select the generated fake systems that are suitable for use as masks. The SMF may determine that a generated fake system is suitable for use as a mask based on its credibility (as verified by humans or via process) and/or its ability to "cover" the protected system. For example, the SMF may determine that a generated fake system is suitable based on whether its frequency protection requirements are equal or greater than the frequency protection requirements of the real protected system.

In some embodiments, the SMF may configured to determine that a resource (or asset, entity, device, etc.) in the protected system has become active or has started operating within the detection area of the system, collect data from sensors in the vicinity of the resource, and/or receive or feed a pattern of data into a neural network (e.g., GAN) that detects the activity of the protected system. The SMF may identify the type of resource that is active, generate a library of spectrum signatures, query the library of spectrum signatures to obtain a list of applicable masks, intelligently or randomly select one of the masks included in the list, use a combination of the spectrum signature and the movements of the resource to generate a blanking pattern, and use/apply the generated blanking pattern to obscure operations that might otherwise be revealed by reverse engineering the frequency suppression messages emanating from the SMF.

In some embodiments, the SMF may query a library of blanking pattern to obtain a list of applicable masks, and intelligently or randomly select one of the masks included in the list, use the movements of the resource to generate a blanking pattern (without an intervening step from spectrum mask to blanking pattern), and use/apply the generated blanking pattern to obscure operations that might otherwise be revealed by reverse engineering the frequency suppression messages emanating from the SMF.

Figure 6A:
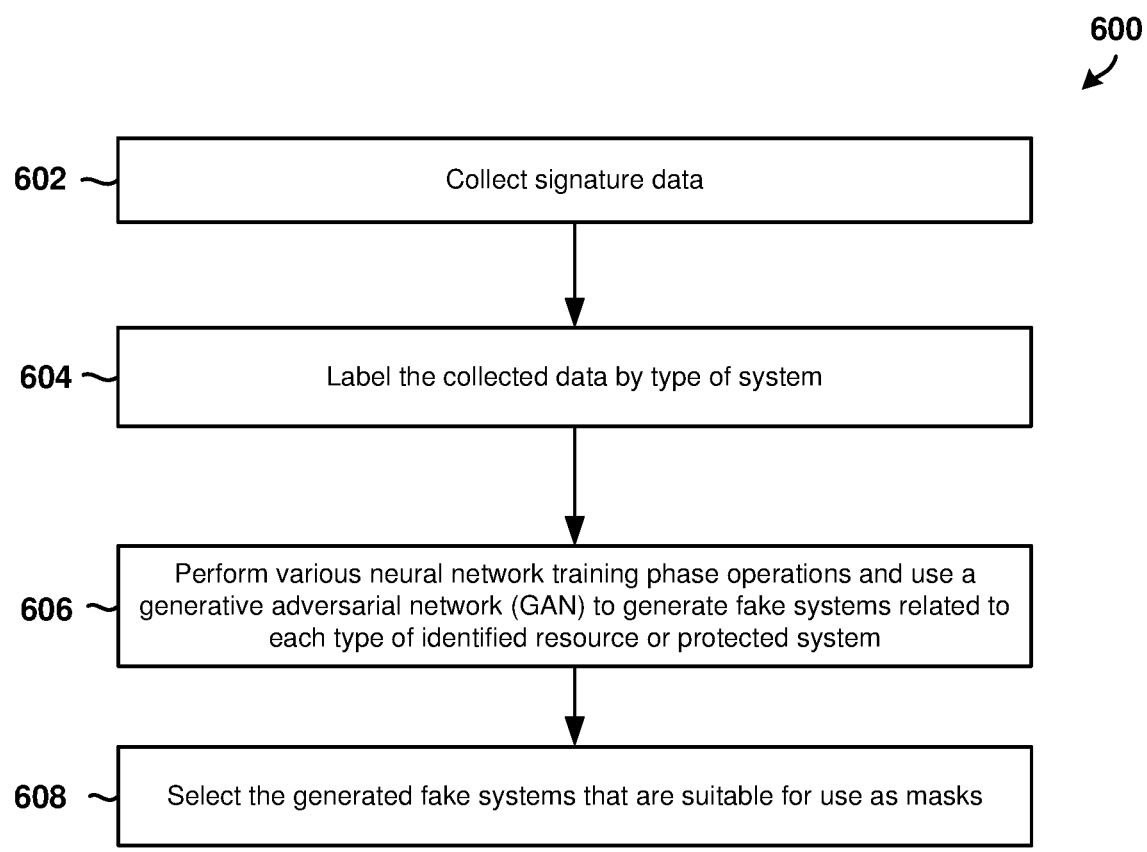
FIGS. 6A and 6B are process flow diagrams illustrating methods of detecting and masking the activity of the resources (or assets, entities, devices, etc.) in a protected system in accordance with some embodiments.
Figure 6B:
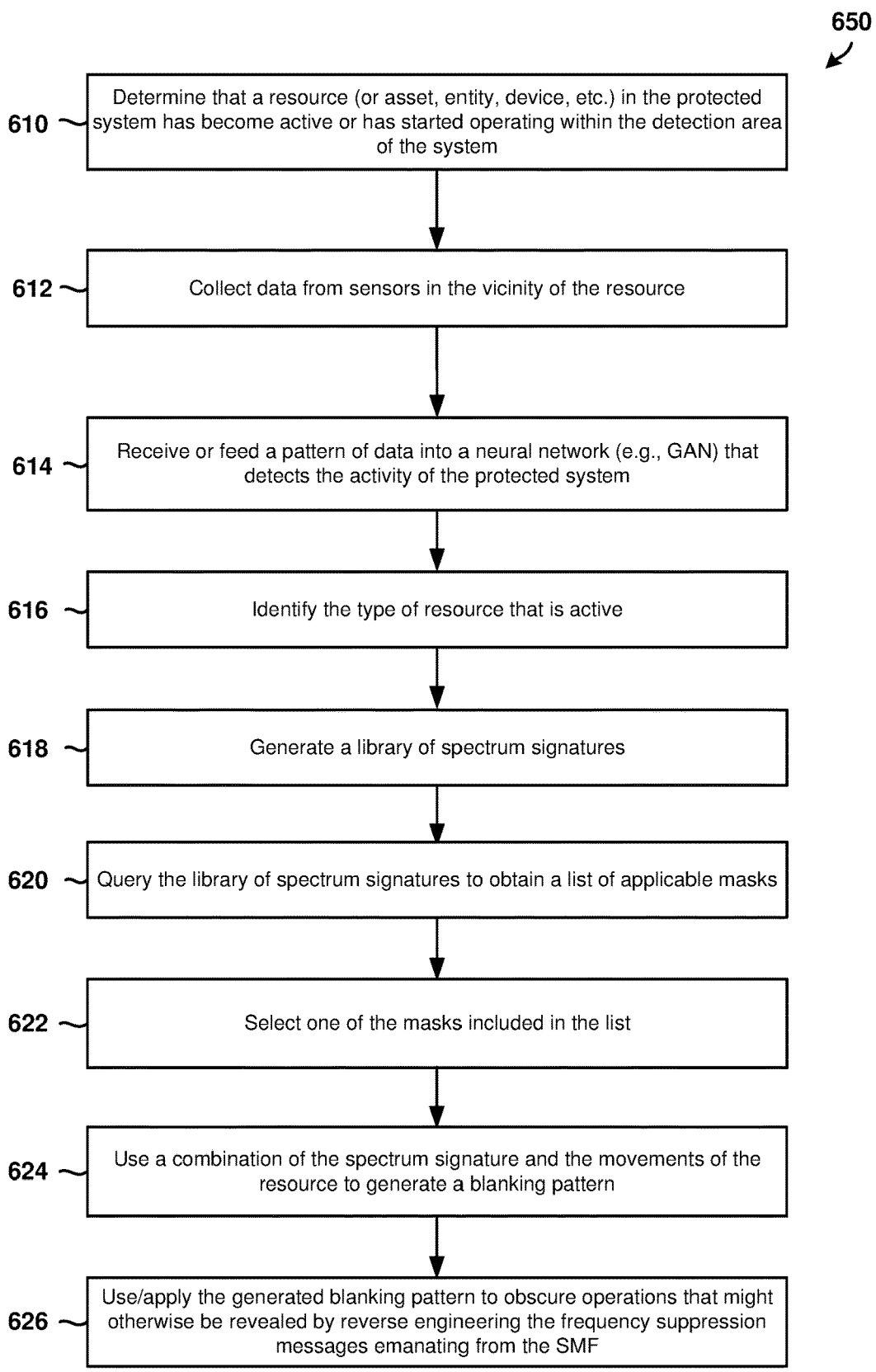

FIGS. 6A and 6B illustrate methods 600, 650 for detection and masking of the activity of the resources (or assets, entities, devices, etc.) in a protected system in accordance with some embodiments. Methods 600, 650 may be implemented by a processor in a spectrum management firewall (SMF).

With reference to FIG. 6A, in block 602, the SMF may collect signature data. In block 604, the SMF may label the collected data by type of system. In block 606, the SMF may perform various neural network training phase operations and/or otherwise use a GAN to generate fake systems related to each type of identified resource or protected system. In block 608, the SMF may select the generated fake systems that are suitable for use as masks.

With reference to FIG. 6B, in block 610, the SMF may determine that a resource (or asset, entity, device, etc.) in the protected system has become active or has started operating within the detection area of the system. In block 612, the SMF may collect data from sensors in the vicinity of the resource. In block 614, the SMF may receive or feed a pattern of data into a neural network (e.g., GAN) that detects the activity of the protected system. In block 616, the SMF may identify the type of resource that is active.

In block 618, the SMF may generate a library of spectrum signatures. In block 620, the SMF may query the library of spectrum signatures to obtain a list of applicable masks. In block 622, the SMF may select one of the masks included in the list. In block 624, the SMF may use a combination of the spectrum signature and the movements of the resource to generate a blanking pattern. In block 626, the SMF may use/apply the generated blanking pattern to obscure operations that might otherwise be revealed by reverse engineering the frequency suppression messages emanating from the SMF.

In the various embodiments, the SMF may be configured to implement or apply different types of obfuscation, including obfuscation of operational patterns, vehicle movements and spectrum separately, spectrum signatures, and/or blanking patterns.

Obfuscation of operational patterns may include performing training operations that include collecting training data, using a neural network (or GAN) to detect patterns, checking data periodicity, autocorrelation, etc., and explicitly modeling how patterns change with increasing activity levels so that additional fake activity can be added in a "realistic" way. The collected training data may be the same data collected and used in generating masks (discussed above), but with an emphasis on the activity periods rather than the emission characteristics. In some embodiments, the collected training data may include the start times and durations of activity per system type, such as time of day, day of week or even seasonal patterns depending on how long data is collected.

Obfuscation of operational patterns may also include an operational phase, which may include loading the operational patterns produced during training, selecting an activity level, and using a random number generator (RNG) combined with the operational patterns and the selected activity level to generate fake periods of activity.

In some embodiments, obfuscation may be based on vehicle movements and spectrum separately. In these embodiments, the training data may include vehicle movements defined as traces that are lists of coordinates and time stamps per system type. The GAN may be used to generate fake traces that are trigged by the fake activity pattern generator.

In some embodiments, obfuscation may be based on spectrum signatures. Spectrum signatures may be patterns of spectrum readings per sensor or patterns of spectrum use applied to real or fake "platforms" (planes, trains or automobiles) so that the combination of fake movements and fake spectrum properties collectively present a credible fake system. In these embodiments, the training data may include sensor readings at specific sensor locations in combination with each other or isolated sensor readings with normalized signal levels. The former method applies to a set of installed sensors at a specific venue. The latter method focuses on the protected system characteristics and may be applied to the same types of systems in other locations. In other words, the data collected at one base may be used to generate fake patterns at an entirely different location.

In some embodiments, obfuscation based on spectrum signatures may include using propagation models in combination with the fake movement generator to obtain fake signal levels and blanking patterns at the same or different area of operations.

In some embodiments, obfuscation may be based on blanking patterns. Obfuscation based on blanking patterns may be simpler than the other obfuscation solutions because it does not require analysis of movements or propagation models. However, the results are not transferable to other areas of operations or to new sensor configurations.

In these embodiments (e.g., obfuscation based on blanking patterns), simple or complicated propagation models may be used to determine which frequencies to blank at which locations in the commercial network based on the sensor readings. The obfuscator may be not supplied any information about the underlying propagation model, only the frequencies that are blanked as a result. As such, the training data includes the blanking patterns that result from the sensors and models that are used. The fake blanking patterns may be generated using GAN and implicitly include all the affects of the locations of the sensors and the propagation model.

A network equipped with components configured in accordance with the embodiments does not need to compete with existing carrier businesses in any geographical area. Instead, it would provide existing carriers with quick and flexible additional 5G capacity if and when they need it, on either a short-term or long-term basis. In addition, such a network would not preclude GE from standing up special-purpose or ad hoc private networks in particular locations utilizing the same spectrum, should it require them.

A network equipped with components configured in accordance with the embodiments could allow a commercial network operator (CWNO) to lower prices, drive increased utilization, improve access to 5G and provide enhanced coverage to underserved areas. As such, the embodiments could reduce the costs of the network build and operations, eliminate retail expenses, and operate through an open access wireless sales model. The embodiments could allow the GE to more readily sell broadband capacity dynamically, at the lowest possible price over cost.

A network equipped with components configured in accordance with the embodiments may allow a GE to sell network capacity to other cellular mobile network operators (MNOs) that need extra capacity, to existing and new mobile virtual network operators (MVNOs) (potentially including the GE as an MVNO to its employees or more broadly to federal employees), and/or to other providers of innovative new products, services and solutions.

Some embodiments may include components configured to implement dynamic spectrum sharing techniques. Such techniques may include: (1) a sharing/coexistence plan that includes rules of engagement to foster collision avoidance; (2) technology that supports dynamic allocation of spectrum and/or network capacity; and (3) a value system for making decisions about sharing to effectively predict when and where spectrum may be made available (e.g., a way to forecast, provision or sell network capacity, etc.).

In some embodiments, the components may be configured to use citizens broadband radio service (CBRS) techniques and technologies to provide dynamic spectrum sharing and/or standards-based techniques and technologies to provide network sharing.

Figure 7:
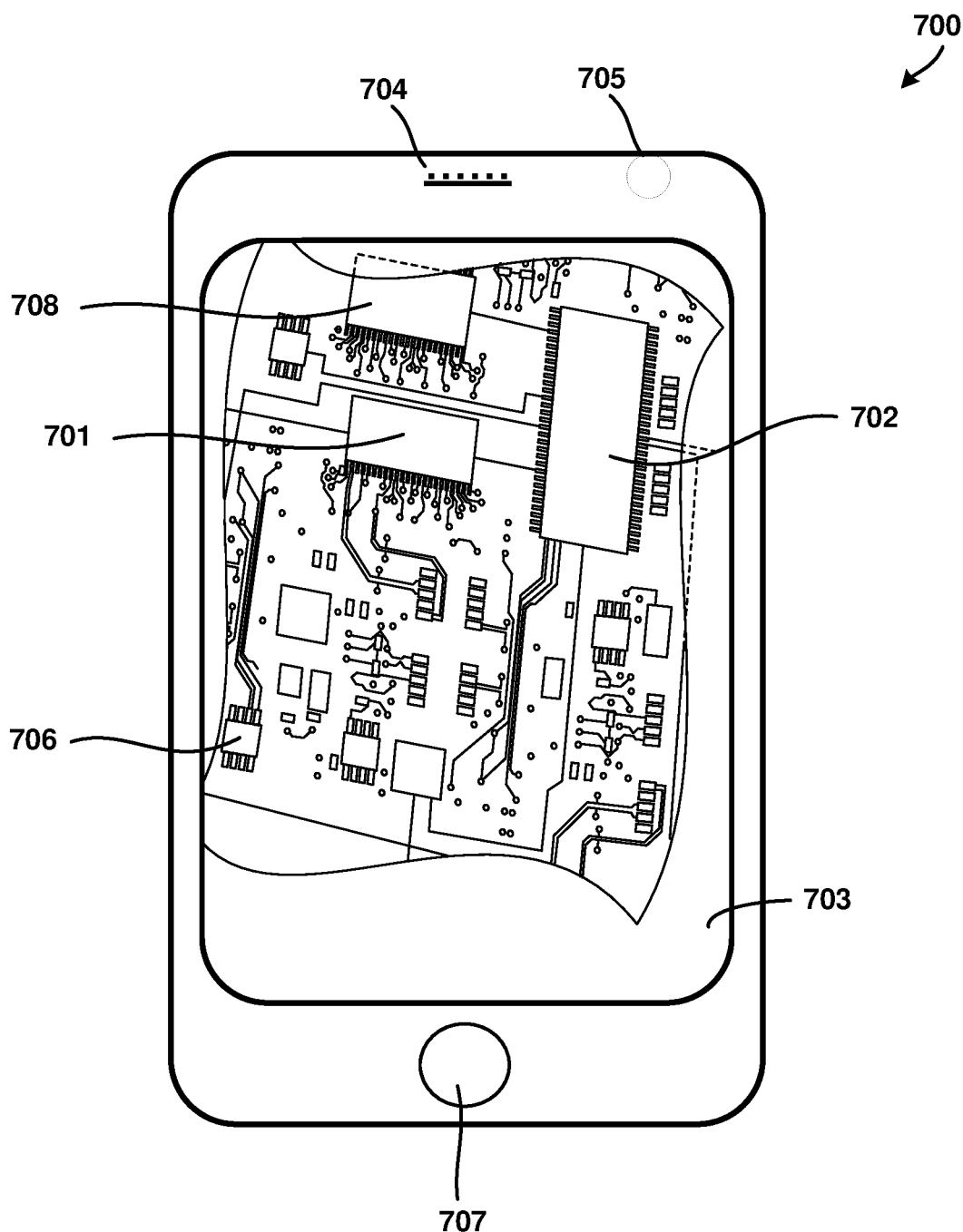
FIG. 7 is a component block diagram of a mobile device that could be included in a commercial or protected network and configured to operate in accordance with the various embodiments.

The various embodiments may be implemented on a variety of mobile wireless computing devices, an example of which is illustrated in FIG. 7. Specifically, FIG. 7 is a system block diagram of a mobile transceiver device in the form of a smartphone/cell phone 700 suitable for use with any of the embodiments. The cell phone 700 may include a processor 701 coupled to internal memory 702, a display 703, and to a speaker 704. Additionally, the cell phone 700 may include an antenna 705 for sending and receiving electromagnetic radiation that may be connected to a wireless data link and/or cellular telephone transceiver 706 coupled to the processor 701. Cell phones 700 typically also include menu selection buttons or rocker switches 707 for receiving user inputs.

A typical cell phone 700 also includes a sound encoding/decoding (CODEC) circuit 708 which digitizes sound received from a microphone into data packets suitable for wireless transmission and decodes received sound data packets to generate analog signals that are provided to the speaker 704 to generate sound. Also, one or more of the processor 701, wireless transceiver 706 and CODEC 708 may include a digital signal processor (DSP) circuit (not shown separately). The cell phone 700 may further include a ZigBee transceiver (i.e., an IEEE 802.15.4 transceiver) for low-power short-range communications between wireless devices, or other similar communication circuitry (e.g., circuitry implementing the Bluetooth® or WiFi protocols, etc.).

Figure 8:
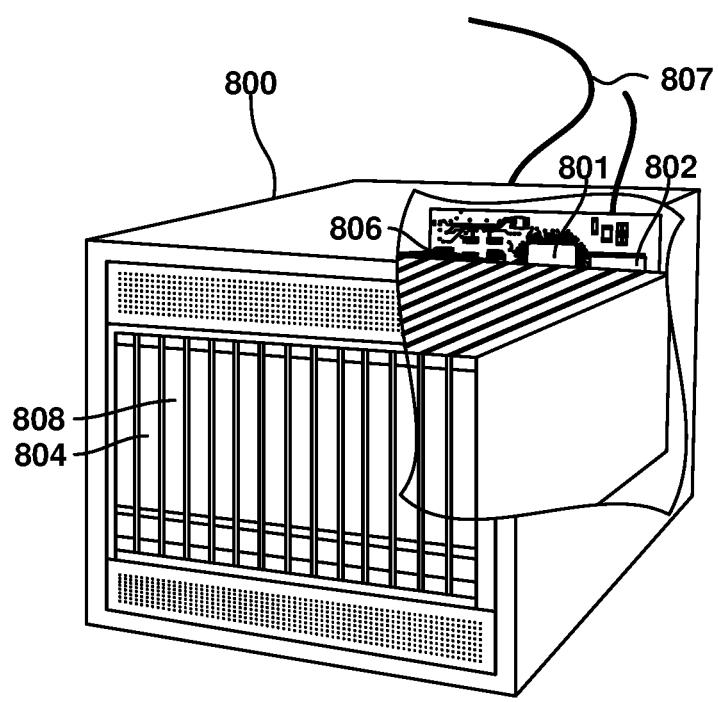
FIG. 8 is a component block diagram of a server suitable for implementing various embodiments.

The embodiments described above, including the spectrum arbitrage functions, may be implemented within a system on any of a variety of commercially available server devices, such as the server 800 illustrated in FIG. 8. Such a server 800 typically includes a processor 801 coupled to volatile memory 802 and a large capacity nonvolatile memory, such as a disk drive 803. The server 800 may also include a floppy disc drive, compact disc (CD) or DVD disc drive 804 coupled to the processor 801. The server 800 may also include network access ports 806 coupled to the processor 801 for establishing data connections with a network 807, such as a local area network coupled to other communication system computers and servers.

The processors 701, 801, may be any programmable microprocessor, microcomputer or multiple processor chip or chips that can be configured by software instructions (applications) to perform a variety of functions, including the functions of the various embodiments described below. In some wireless devices, multiple processors 801 may be provided, such as one processor dedicated to wireless communication functions and one processor dedicated to running other applications. Typically, software applications may be stored in the internal memory 702, 802, before they are accessed and loaded into the processor 701, 801. The processor 701, 801 may include internal memory sufficient to store the application software instructions. In some servers, the processor 801 may include internal memory sufficient to store the application software instructions. In some receiver devices, the secure memory may be in a separate memory chip coupled to the processor 701. The internal memory 702, 802 may be a volatile or nonvolatile memory, such as flash memory, or a mixture of both. For the purposes of this description, a general reference to memory refers to all memory accessible by the processor 701, 801, including internal memory 702, 802, removable memory plugged into the device, and memory within the processor 701, 801 itself.

The foregoing method descriptions and the process flow diagrams are provided merely as illustrative examples and are not intended to require or imply that the steps of the various embodiments may be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DPC), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DPC and a microprocessor, a plurality of microprocessors, one or more microprocessors in conjunction with a DPC core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of dynamically sharing spectrum between a commercial network and a protected system network, comprising:
    receiving, by a processor a spectrum management firewall (SMF) computing device, information from the commercial network;
    receiving, by the processor, characteristic information identifying one or more characteristics of a resource or entity in the protected system network;
    determining, by the processor, a class of system (COS) and an area of operation (AOO) for the resource or entity based on the characteristic information received from the protected system network;
    determining, by the processor, potential interference based on the information received from the commercial network and the characteristic information received from the protected system network;
    determining, by the processor, which frequencies may be suppressed on which cells in the commercial network based on the determined potential interference;
    generating, by the processor, a suppression message that identifies the determined frequencies per cell; and
    sending, by the processor, the generated suppression message to a component in the commercial network to cause that component to suppress the identified frequencies in the identified cells.

2. The method of claim 1, wherein generating the suppression message that identifies the determined frequencies per cell that mask the activities, operations, communications, locations, features, properties, or characteristics of the resource or entity in the protected system network.

3. The method of claim 2, wherein generating the obfuscated message comprises adding additional frequencies that mask the activities, operations, communications, locations, features, properties, or characteristics of the resource or entity in the protected system network to the suppression message.

4. The method of claim 1, further comprising:
    using a generative adversarial network (GAN) that includes a deep neural network and a generator to produce fake data;
    inserting the generated fake data into the suppression message prior to sending the generated suppression message to the component in the commercial network; or
    using the generated fake data to generate additional suppression messages that are intentionally misleading and sending the additional suppression messages to the component in the commercial network.

5. The method of claim 1, further comprising using a generative adversarial network (GAN) that includes a deep neural network and a generator to create credible fake activities of the resource or entities in the protected systems network including movement patterns, emissions spectrums, frequency blanking patterns and realistic activity schedules.

6. The method of claim 1, wherein:
receiving characteristic information from the protected system network comprises:
receiving detected activity information, signal level information and frequency information collected by sensors within a vicinity of the resource or entity in the protected systems network in response to detecting that the resource or entity recently became active; and
determining the COS and the PAOO based on the characteristic information received from the protected system network comprises:
determining the COS and an approximate area associated with the recently active resource or entity based on the received activity information, signal level information, and frequency information.

7. The method of claim 1, wherein receiving characteristic information from the protected system network comprises:
receiving a spectrum reservation message from the protected system network indicating that the resource or entity is anticipated to become or is becoming active in an area; and
wherein determining the COS and the AOO based on the characteristic information received from the protected system network comprises:
determining the COS and an approximate area of the resource or entity that is anticipated to become or is becoming active based on the received spectrum reservation message.

8. The method of claim 1, wherein sending the generated message to the component in the commercial network to cause that component to suppress the identified frequencies in the identified cells comprises sending the generated message to the component in the commercial network to cause that component to:
stop all transmissions on the identified frequencies;
reduce power on the identified frequencies;
reorient antennas to direct power away from the resource or entity in the protected systems network; or
down-tilt or direct the antennas into focused areas that only allow the power to be transmitted in the immediate vicinity of the identified cells.

9. The method of claim 1, further comprising:
receiving, by the processor, a notification message from the protected system network indicating that a detected activity identified in the received characteristic information has ceased; and
causing, by the processor, the component in the commercial network to cease suppressing the identified frequencies in the identified cells and restore power levels in response to the processor receiving the notification message from the protected system network indicating that the detected activity identified in the received characteristic information has ceased.

10. The method of claim 9, wherein causing the component in the commercial network to cease suppressing the identified frequencies in the identified cells and restore power levels comprises sending a communication message to the component that causes the component to reorient and uptilt antennas back to configurations that are optimized for full utilization of the identified frequencies on the commercial network.

11. The method of claim 1, wherein determining potential interference based on the information received from the commercial network and the characteristic information received from the protected system network comprises:
determining the cell sites and frequencies that would result in interference between the resource or entity within the protected systems network and specific cells and attached mobiles in the commercial network.

12. A server computing device implementing a spectrum management firewall (SMF), comprising:
a processor configured with processor-executable instructions to perform operations comprising:
receiving information from a commercial network;
receiving characteristic information identifying one or more characteristics of a resource or entity in a protected system network;
determining a class of system (COS) and a planned area of operation (AOO) for the resource or entity based on the characteristic information received from the protected system network;
determining potential interference based on the information received from the commercial network and the characteristic information received from the protected system network;
determining which frequencies may be suppressed on which cells in the commercial network based on the determined potential interference;
generating a suppression message that identifies the determined frequencies per cell; and
sending the generated suppression message to a component in the commercial network to cause that component to suppress the identified frequencies in the identified cells.

13. The server computing device of claim 12, wherein the processor is configured with processor executable instructions to perform operations such that generating the suppression message that identifies the determined frequencies per cell comprises generating an obfuscation message that mask the activities, operations, communications, locations, features, properties, or characteristics of the resource or entity in the protected system network.

14. The server computing device of claim 13, wherein the processor is configured with processor executable instructions to perform operations such that generating the obfuscation message comprises adding additional frequencies that mask the activities, operations, communications, locations, features, properties, or characteristics of the resource or entity in the protected system network to the suppression message.

15. The server computing device of claim 12, wherein the processor is configured with processor executable instructions to perform operations further comprising:
using a generative adversarial network (GAN) that includes a deep neural network and a generator to produce fake data;
inserting the generated fake data into the suppression message prior to sending the generated suppression message to the component in the commercial network; or
using the generated fake data to generate additional suppression messages that are intentionally misleading and sending the additional suppression messages to the component in the commercial network.

16. The server computing device of claim 12, wherein the processor is configured with processor executable instructions to perform operations further comprising using a generative adversarial network (GAN) that includes a deep neural network and a generator to detect and differentiate between real and fake activities of the resource or entities in the protected systems network.

17. The server computing device of claim 12, wherein the processor is configured with processor executable instructions to perform operations such that:
   receiving characteristic information from the protected system network comprises:
   receiving detected activity information, signal level information and frequency information collected by sensors within a vicinity of the resource or entity in the protected systems network in response to detecting that the resource or entity recently became active; and
   determining the COS and the PAOO based on the characteristic information received from the protected system network comprises:
   determining the COS and an approximate area associated with the recently active resource or entity based on the received activity information, signal level information, and frequency information.

18. The server computing device of claim 12, wherein the processor is configured with processor executable instructions to perform operations such that receiving characteristic information from the protected system network comprises:
   receiving a spectrum reservation message from the protected system network indicating that the resource or entity is anticipated to become active in an area; and
   wherein the processor is configured with processor executable instructions to perform operations such that determining the COS and the AOO based on the characteristic information received from the protected system network comprises:
   determining the COS and an approximate area of the resource or entity that is anticipated to become active based on the received spectrum reservation message.

19. The server computing device of claim 12, wherein the processor is configured with processor executable instructions to perform operations such that sending the generated message to the component in the commercial network to cause that component to suppress the identified frequencies in the identified cells comprises sending the generated message to the component in the commercial network to cause that component to:
   stop all transmissions on the identified frequencies;
   reduce power on the identified frequencies;
   reorient antennas to direct power away from the resource or entity in the protected systems network; or
   down-tilt or direct the antennas into focused areas that only allow the power to be transmitted in the immediate vicinity of the identified cells.

20. The server computing device of claim 12, wherein the processor is configured with processor executable instructions to perform operations further comprising:
   receiving a notification message from the protected system network indicating that a detected activity identified in the received characteristic information has ceased; and
   causing the component in the commercial network to cease suppressing the identified frequencies in the identified cells and restore power levels in response to the processor receiving the notification message from the protected system network indicating that the detected activity identified in the received characteristic information has ceased.

21. The server computing device of claim 20, wherein the processor is configured with processor executable instructions to perform operations such that causing the component in the commercial network to cease suppressing the identified frequencies in the identified cells and restore power levels comprises sending a communication message to the component that causes the component to reorient and uptilt antennas back to configurations that are optimized for full utilization of the identified frequencies on the commercial network.

22. The server computing device of claim 12, wherein the processor is configured with processor executable instructions to perform operations such that determining potential interference based on the information received from the commercial network and the characteristic information received from the protected system network comprises:
   determining the cell sites and frequencies that would result in interference between the resource or entity within the protected systems network and specific cells and attached mobiles in the commercial network.

23. A non-transitory computer readable storage medium having stored thereon processor-executable software instructions configured to cause a processor of a server computing device perform operations for dynamically sharing spectrum between a commercial network and a protected system network, the operations comprising:
   receiving information from the commercial network;
   receiving characteristic information identifying one or more characteristics of a resource or entity in the protected system network;
   determining a class of system (COS) and a area of operation (AOO) for the resource or entity based on the characteristic information received from the protected system network;
   determining potential interference based on the information received from the commercial network and the characteristic information received from the protected system network;
   determining which frequencies may be suppressed on which cells in the commercial network based on the determined potential interference;
   generating a suppression message that identifies the determined frequencies per cell; and
   sending the generated suppression message to a component in the commercial network to cause that component to suppress the identified frequencies in the identified cells.

24. The non-transitory computer readable storage medium of claim 23, wherein the stored processor-executable software instructions are configured to cause a processor to perform operations such that generating the suppression message that identifies the determined frequencies per cell comprises generating an obfuscation message that mask the activities, operations, communications, locations, features, properties, or characteristics of the resource or entity in the protected system network.

25. The non-transitory computer readable storage medium of claim 24, wherein the stored processor-executable software instructions are configured to cause a processor to perform operations such that generating the obfuscation message comprises adding additional frequencies that mask the activities, operations, communications, locations, features, properties, or characteristics of the resource or entity in the protected system network to the suppression message.

26. The non-transitory computer readable storage medium of claim 23, wherein the stored processor-executable software instructions are configured to cause a processor to perform operations further comprising:
   using a generative adversarial network (GAN) that includes a deep neural network and a generator to produce fake data;

inserting the generated fake data into the suppression message prior to sending the generated suppression message to the component in the commercial network; or using the generated fake data to generate additional suppression messages that are intentionally misleading and sending the additional suppression messages to the component in the commercial network.

27. The non-transitory computer readable storage medium of claim 23, wherein the stored processor-executable software instructions are configured to cause a processor to perform operations further comprising using a generative adversarial network (GAN) that includes a deep neural network and a generator to detect and differentiate between real and fake activities of the resource or entities in the protected systems network.

28. The non-transitory computer readable storage medium of claim 23, wherein the stored processor-executable software instructions are configured to cause a processor to perform operations such that:

receiving characteristic information from the protected system network comprises:

receiving detected activity information, signal level information and frequency information collected by sensors within a vicinity of the resource or entity in the protected systems network in response to detecting that the resource or entity recently became active; and determining the COS and the AOO based on the characteristic information received from the protected system network comprises:

determining the COS and an approximate area associated with the recently active resource or entity based on the received activity information, signal level information, and frequency information.

29. The non-transitory computer readable storage medium of claim 23, wherein the stored processor-executable software instructions are configured to cause a processor to perform operations such that receiving characteristic information from the protected system network comprises:

receiving a spectrum reservation message from the protected system network indicating that the resource or entity is anticipated to become active in an area; and wherein the stored processor-executable software instructions are configured to cause a processor to perform operations such that determining the COS and the AOO based on the characteristic information received from the protected system network comprises:

determining the COS and an approximate area of the resource or entity that is anticipated to become active based on the received spectrum reservation message.

30. The non-transitory computer readable storage medium of claim 23, wherein the stored processor-executable software instructions are configured to cause a processor to perform operations such that sending the generated message to the component in the commercial network to cause that component to suppress the identified frequencies in the identified cells comprises sending the generated message to the component in the commercial network to cause that component to:

stop all transmissions on the identified frequencies;

reduce power on the identified frequencies;

reorient antennas to direct power away from the resource or entity in the protected systems network; or down-tilt or direct the antennas into focused areas that only allow the power to be transmitted in the immediate vicinity of the identified cells.

31. The non-transitory computer readable storage medium of claim 23, wherein the stored processor-executable software instructions are configured to cause a processor to perform operations further comprising:

receiving a notification message from the protected system network indicating that a detected activity identified in the received characteristic information has ceased; and causing the component in the commercial network to cease suppressing the identified frequencies in the identified cells and restore power levels in response to the processor receiving the notification message from the protected system network indicating that the detected activity identified in the received characteristic information has ceased.

32. The non-transitory computer readable storage medium of claim 31, wherein the stored processor-executable software instructions are configured to cause a processor to perform operations such that causing the component in the commercial network to cease suppressing the identified frequencies in the identified cells and restore power levels comprises sending a communication message to the component that causes the component to reorient and uptilt antennas back to configurations that are optimized for full utilization of the identified frequencies on the commercial network.

33. The non-transitory computer readable storage medium of claim 23, wherein the stored processor-executable software instructions are configured to cause a processor to perform operations such that determining potential interference based on the information received from the commercial network and the characteristic information received from the protected system network comprises:

determining the cell sites and frequencies that would result in interference between the resource or entity within the protected systems network and specific cells and attached mobiles in the commercial network.

* * * * *